(12) United States Patent
Matsuura

(10) Patent No.: US 11,577,525 B2
(45) Date of Patent: Feb. 14, 2023

(54) PRINTER, CONTROL METHOD OF PRINTER, AND NON-TRANSITORY COMPUTER READABLE MEDIUM STORING CONTROL PROGRAM OF PRINTER

(71) Applicant: Brother Kogyo Kabushiki Kaisha, Nagoya (JP)

(72) Inventor: Kazunari Matsuura, Komaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 29 days.

(21) Appl. No.: 17/376,946

(22) Filed: Jul. 15, 2021

(65) Prior Publication Data
US 2022/0016903 A1      Jan. 20, 2022

(30) Foreign Application Priority Data
Jul. 17, 2020    (JP) .............................. JP2020-123272

(51) Int. Cl.
*B41J 2/21*    (2006.01)
*B41J 3/01*    (2006.01)

(52) U.S. Cl.
CPC ............... *B41J 3/01* (2013.01); *B41J 2/2146* (2013.01)

(58) Field of Classification Search
CPC ........... B41J 3/01; B41J 2/2146; G06K 1/121; H04N 1/4015
See application file for complete search history.

(56) References Cited

U.S. PATENT DOCUMENTS 8,662,615 B2    3/2014  Zama et al.
2011/0242173 A1  10/2011  Zama et al.

FOREIGN PATENT DOCUMENTS

| JP | 2001-270143 A | | 10/2001 |
| JP | 2004082555 A | * | 3/2004 |
| JP | 2006-044027 A | | 2/2006 |
| JP | 2011-207076 A | | 10/2011 |

* cited by examiner

*Primary Examiner* — Sharon Polk
(74) *Attorney, Agent, or Firm* — Banner & Witcoff, Ltd.

(57) ABSTRACT

There is provided a printer including: a head including head chips; a conveyor; and a controller. The head chips are arranged in an intersecting direction that intersects with a conveyance direction, and two head chips adjacent to each other in the intersecting direction are shifted from each other in the conveyance direction. The controller is configured to execute: print a bar code having a first portion and a second portion; determine based on the printing data whether a seam between the two head chips is positioned in the first portion; and adjust a printing position of the bar code with respect to the head so that the seam is positioned in the second portion.

11 Claims, 10 Drawing Sheets

FIG. 2
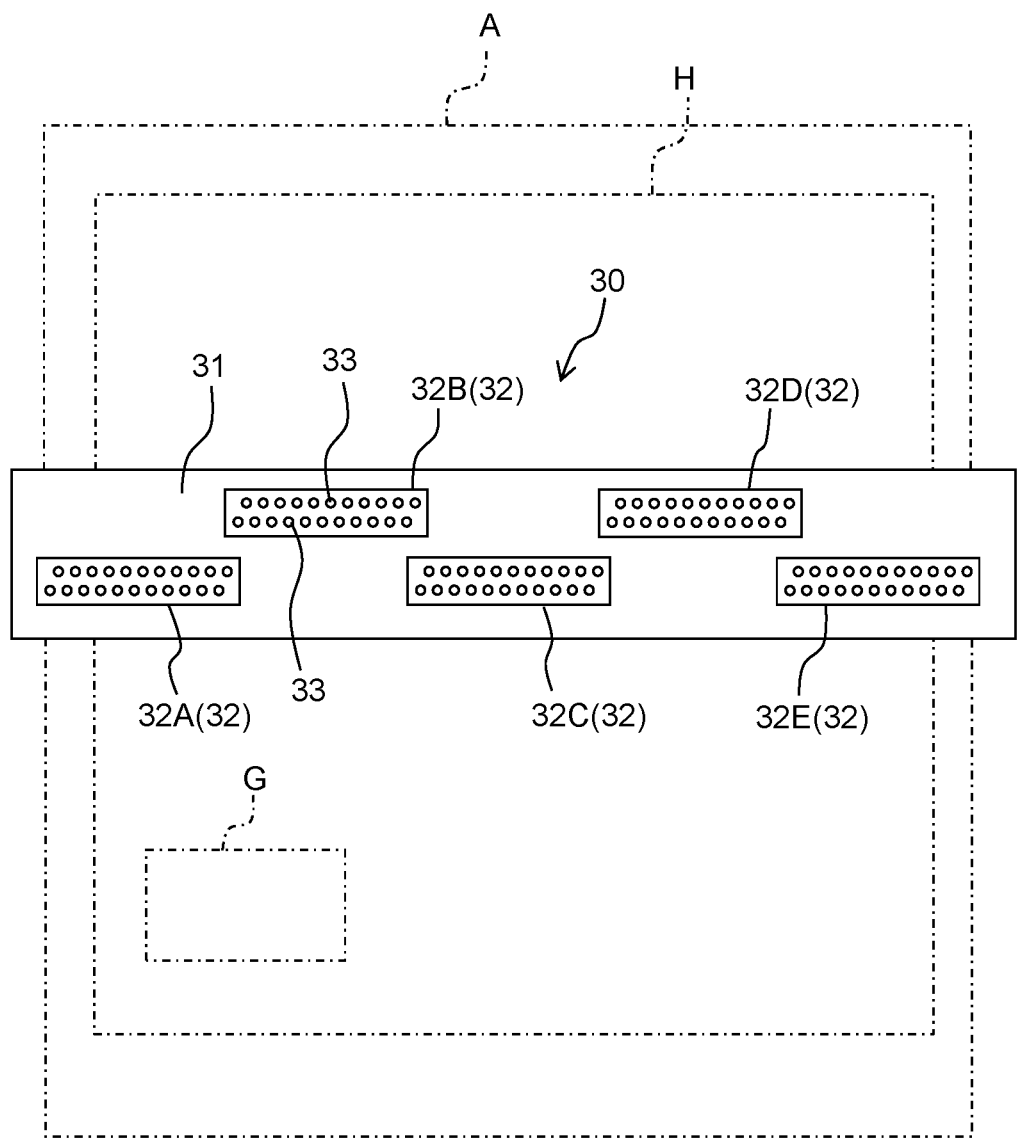
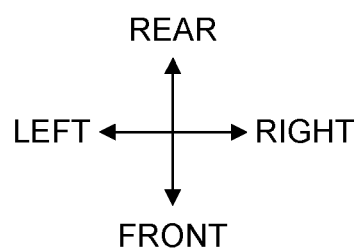

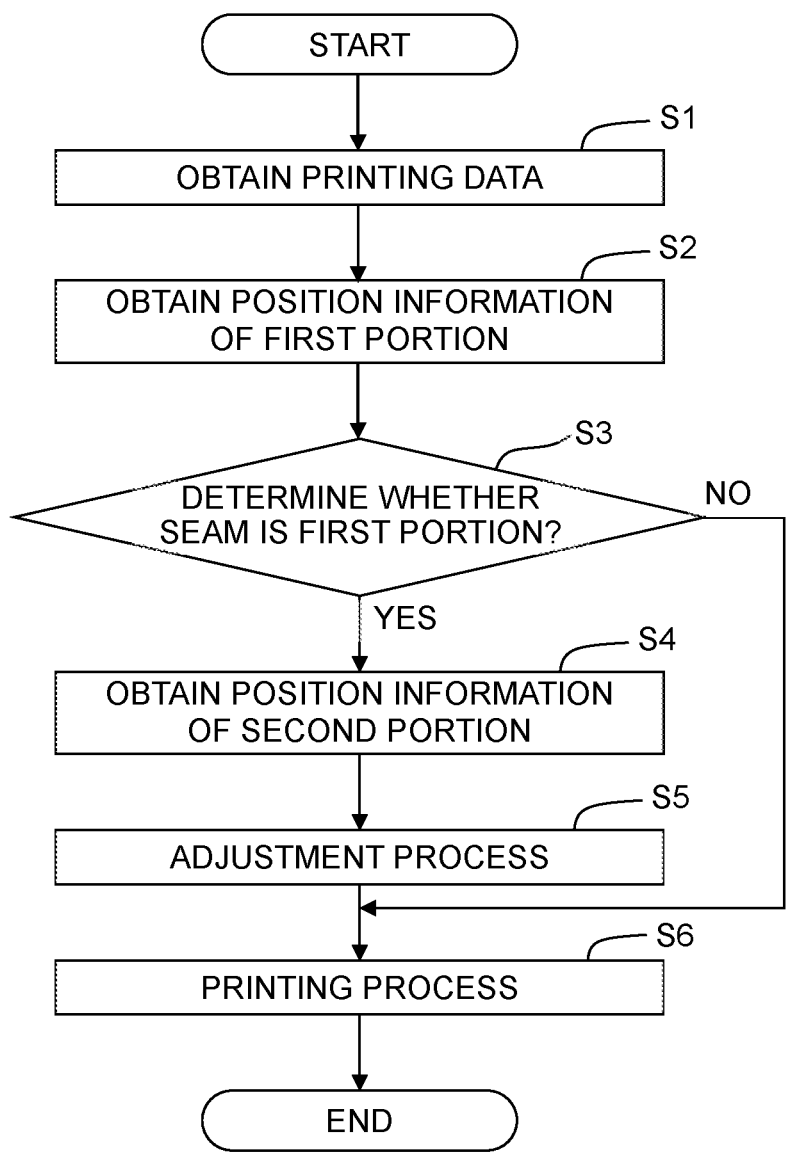

PRINTER, CONTROL METHOD OF PRINTER, AND NON-TRANSITORY COMPUTER READABLE MEDIUM STORING CONTROL PROGRAM OF PRINTER

CROSS REFERENCE TO RELATED APPLICATIONS

The present application claims priority from Japanese Patent Application No. 2020-123272 filed on Jul. 17, 2020, the disclosure of which is incorporated herein by reference in its entirety.

BACKGROUND

The present disclosure relates to a printer, a control method of a printer, and a non-transitory computer readable medium storing a control program of a printer.

In a publicly-known printer, when a line head has a defective printing element, a group of printing elements capable of printing a bar code normally are retrieved, and the bar code is printed by using them.

SUMMARY

This line head includes multiple head chips. In this case, the head chips are arranged alternately in a conveyance direction of a printing medium and an intersecting direction intersecting with the conveyance direction. In a seam between the head chips adjacent to each other in the intersecting direction, landing positions of liquid discharged from the head chips to the printing medium are likely to be shifted in the intersecting direction. The shift of the landing positions makes it impossible to print a desired bar code, which may decrease in reading accuracy of the bar code.

In view of the above circumstances, an object of the present disclosure is to provide a printer, a printer control method, and a non-transitory computer readable medium storing a printer control program that are capable of inhibiting a decrease in reading accuracy of a bar code that may otherwise be caused by a shift of a landing position.

According to an aspect of the present disclosure, there is provided a printer including: a head including a plurality of head chips each of which includes a plurality of nozzles from which a liquid is discharged onto a medium; a conveyor configured to convey the medium in a conveyance direction; and a controller. In the head, the head chips are arranged in an intersecting direction that intersects with the conveyance direction, and two head chips that are included in the head chips and that are adjacent to each other in the intersecting direction are shifted from each other in the conveyance direction. The controller is configured to execute: as a printing process, printing a bar code based on printing data, the bar code including a bar and a space alternately arranged in the intersecting direction, the bar code including a predefined first portion and a predefined second portion different from the first portion; as a first determination process, determining based on the printing data whether a seam between the two head chips adjacent to each other in the intersecting direction is positioned in the first portion; as an adjustment process, adjusting a printing position of the bar code with respect to the head so that the seam is positioned in the second portion in a case that the controller has determined in the first determination process that the seam is positioned in the first portion.

The printer according to the present disclosure is capable of inhibiting the decrease in reading accuracy of the bar code that may otherwise be caused by the shift of the landing position. Similarly, the printer control method and the non-transitory computer readable medium storing the printer control program according to the present disclosure are also capable of inhibiting the decrease in reading accuracy of the bar code that may otherwise be caused by the shift of the landing position.

BRIEF DESCRIPTION OF THE DRAWINGS

FIG. 2 is a schematic view of a head in FIG. 1 as viewed from below.

FIG. 6 is a flowchart indicating an example of a control method of the printer in FIG. 1.

DETAILED DESCRIPTION

<Configuration of Printer>

Figure 1:
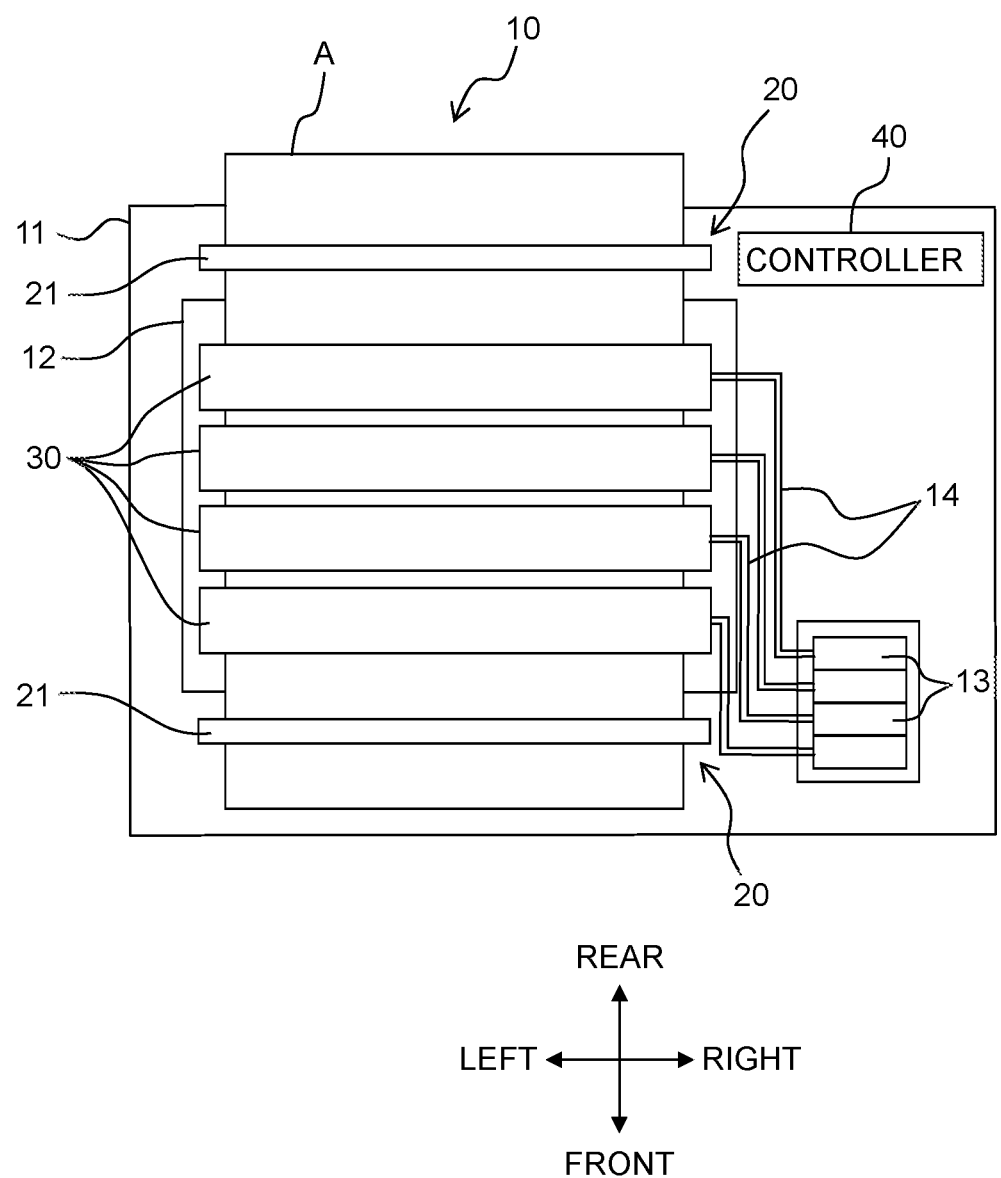
FIG. 1 is a schematic view of a printer according to an embodiment as viewed from above.

As depicted in FIG. 1, a printer 10 according to an embodiment of the present disclosure is, for example, an ink-jet printer that discharges a liquid such as ink on a printing medium A. The printer 10 includes a casing 11, a platen 12, a conveyor 20, four heads 30, four tanks 13, and a controller 40. Details of the controller 40 are described below.

A conveyance direction in which the printing medium A is conveyed by the conveyor 20 is referred to as the rear, and a side opposite to the rear is referred to as the front. An intersecting direction intersecting with (e.g., orthogonal to) the conveyance direction is referred to as a left-right direction. A direction intersecting with (e.g., orthogonal to) the front-rear direction and the left-right direction is referred to as an up-down direction. An arrangement direction of the printer 10, however, is not limited thereto.

The casing 11 accommodates the platen 12, the conveyor 20, the heads 30, the tanks 13, and the controller 40. The platen 12 has a flat upper surface and the printing medium A is placed on the upper surface.

Figure 3:
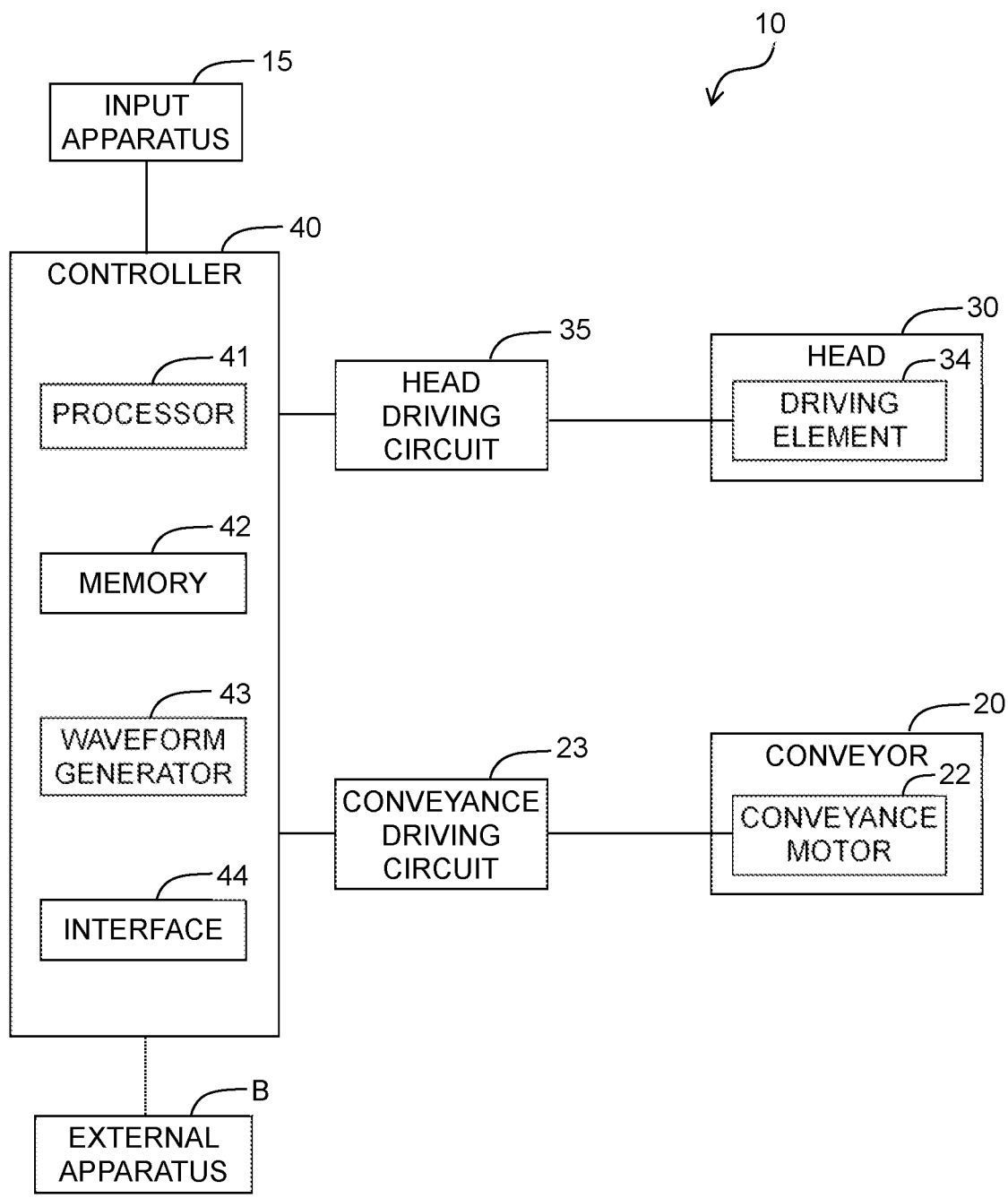
FIG. 3 is a functional block diagram indicating an example of the printer in FIG. 1.

The conveyor 20 includes a pair of conveyance rollers 21 and a conveyance motor 22 (FIG. 3). The pair of conveyance rollers 21 is disposed so that the heads 30 are interposed therebetween in the front-rear direction. Center shafts of the conveyance rollers 21 extend in the left-right direction and arranged in parallel with each other. The conveyance motor 22 is coupled to the conveyance rollers 21. The conveyance motor 22 rotates the conveyance rollers 21 to convey the printing medium A rearward.

The heads 30 are secured to the casing 11. Each head 30 is rectangular. A length in the left-right direction of the head 30 is longer than that of the printing medium A. A lower surface of each head 30 faces the upper surface of the platen 12. The lower surface of each head 30 is parallel to the upper surface of the platen 12. The four heads 30 are arranged in a row in the front-rear direction. Details of the head 30 are described below.

The four tanks 13 are connected to the heads 30 via tubes 14. In this embodiment, the number of the tanks 13 is the same as the number of the heads 30. The four tanks 13 contain different kinds of liquids. In this embodiment, the four tanks 13 respectively contain liquids of cyan, magenta, yellow, and black. The liquid in each of the tanks 13 is supplied to the corresponding one of the heads 30 via the tube 14. The number of the heads 30 and the number of the tanks 13 are not necessarily limited to four, and any number of the heads 30 and any number of the tanks 13 may be provided. The number of the heads 30 is not necessarily the same as the number of the tanks 13.

<Configuration of Head>

As depicted in FIG. 2, the head 30 includes a holding base 31 and head chips 32. The holding base 31 has, for example, a rectangular parallelepiped shape. The holding base 31 holds the head chips 32 so that lower surfaces (discharge surfaces) of the head chips 32 are exposed from the lower surface of the holding base 31. FIG. 2 only depicts one head 30 for easy understanding.

Each of the head chips 32 includes nozzles 33 and driving elements 34 (FIG. 3) corresponding to the respective nozzles 33. The liquid is discharged from the nozzles 33 by driving the driving elements 34. Each head chip 32 is formed having nozzle rows arranged in the front-rear direction. Each nozzle row includes nozzles 33 aligned in the left-right direction at predefined pitches. That is, the nozzles 33 are arranged in the left-right direction at regular intervals.

In the head 30, the head chips 32 are arranged in the left-right direction and the head chips 32 adjacent to each other in the left-right direction are arranged to be shifted from each other in the front-rear direction. That is, the head chips 32 are arranged zigzag. The head chips 32 are arranged in the left-right direction so that the nozzle 33 are arranged in the left-right direction at regular intervals. A length in the left-right direction of a portion including the nozzles 33 of the head chips 32 is longer than a length in the left-right direction of the printing medium A.

As depicted in FIG. 2, the head chips 32 include head chips 32A, 32B, 32C, 32D, and 32E in this embodiment. The head chips 32A, 32B, 32C, 32D, and 32E are arranged in the left-right direction in this order starting from the left side. The head chips 32A, 32C, and 32E are arranged in the left-right direction to form a row at the front side of the head chips 32B and 32D. The head chips 32B and 32D are arranged in the left-right direction so that they are parallel to the head chips 32A, 32C, and 32E.

The head chip 32A and the head chip 32B are arranged in the front-rear direction at an interval. The head chip 32C and the head chip 32B are arranged in the front-rear direction at an interval. The head chip 32C and the head chip 32D are arranged in the front-rear direction at an interval. The head chip 32E and the head chip 32D are arranged in the front-rear direction at an interval. Here, the interval in the front-rear direction between the head chips 32A and 32B, the interval in the front-rear direction between the head chips 32C and 32B, the interval in the front-rear direction between the head chips 32C and 32D, and the interval in the front-rear direction between the head chips 32E and 32D are equal to each other or substantially equal to each other.

The head chip 32A and the head chip 32C are arranged in the left-right direction at an interval. The head chip 32B and the head chip 32D are arranged in the left-right direction at an interval. The head chip 32C and the head chip 32E are arranged in the left-right direction at an interval. Here, the interval in the left-right direction between the head chips 32A and 32C, the interval in the left-right direction between the head chips 32B and 32D, and the interval in the left-right direction between the head chips 32C and 32E are equal to each other or substantially equal to each other.

The interval in the left-right direction between the head chips 32A and 32C is larger than the interval in the front-rear direction between the head chips 32A and 32B. Thus, the interval in the left-right direction between the head chips 32 is larger than the interval in the front-rear direction between the head chips 32.

The head chip 32A and the head chip 32B are arranged in the front-rear direction at the interval. Here, assuming that the printing medium A is skewed (conveyed obliquely) with respect to the front-rear direction by the conveyor 20. In this case, when a bar C described below is printed by discharging liquid from the head chips 32A and 32B, the bar C may be divided into two pieces due to the interval between the head chips 32A and 32B. This inhibits a reader for a bar code G described below from reading the bar C accurately, and thus the reader can not read the bar code G.

When the head chips 32 adjacent to each other are viewed from the front side, one or more nozzles 33 in one of the head chips 32 may overlap in the front-rear direction with one or more nozzles 33 in the other of the head chips 32. In this case, the driving element 34 is driven so that liquid is discharged from any one of the nozzles 33 overlapping with each other and no liquid is discharged from the remaining nozzles 33.

Figure 4A:
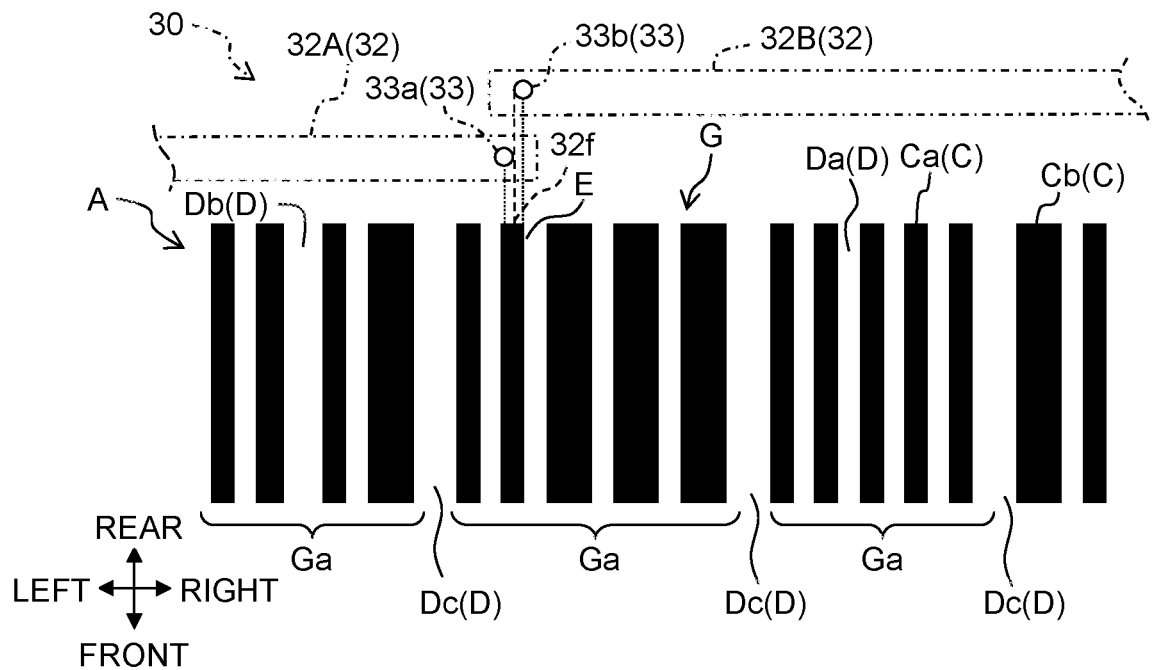
FIG. 4A depicts the head and a bar code when a seam is positioned in a first portion.

Accordingly, the nozzles 33 from which liquid is discharged are arranged at regular intervals in the head chips 32, and landing positions of the liquid discharged from the nozzles 33 are arranged in the left-right direction at regular intervals. Thus, from among the nozzles 33 from which liquid is discharged, the nozzle 33 at an end of one of the head chips 32 adjacent to each other (e.g., the nozzle 33 at a right end of the head chip 32A in FIG. 4A) is adjacent to the nozzle 33 at an end of the other of the head chips 32 (e.g., the nozzle 33 at a left end of the head chip 32B in FIG. 4A). A portion between these nozzles 33 is a seam 32f between the head chips 32 (FIG. 4A).

<Configuration of Controller>

As depicted in FIG. 3, the controller 40 includes a processor 41, a memory 42, a waveform generator 43, and an interface 44. The interface 44 is connected to an external apparatus B such as a computer and network. The interface 44 receives a variety of data such as printing data from the external apparatus B. The printing data includes image data (e.g., raster data) indicating an image to be printed on the printing medium A.

The memory 42 is a memory to which the processor 41 can access. For example, the memory 42 is formed by a RAM and a ROM. The RAM temporarily stores a variety of data. The variety of data are exemplified by printing data and data converted by the processor 41. The ROM stores programs for executing various processes. The programs may be obtained from the external apparatus B or may be stored in any other storage medium than the memory 42.

The processor 41 is, for example, formed by a processer such as a CPU and an integrated circuit such as an ASIC. The processor 41 executes various processes by executing the program(s) stored in the ROM and controlling the driving elements 34 and the conveyance motor 22. For example, the controller 40 executes a printing process, a first determination process, and an adjustment process. The printing process, the first determination process, and the adjustment process are described below.

The waveform generator 43 generates a waveform signal that defines a waveform of a driving signal to be output to the driving element 34. The waveform generator 43 may be a dedicated circuit, and may be formed by the processor 41 and the memory 42. The waveform signal is, for example, a pulse signal that includes multiple kinds of waveform signals having mutually different amounts of liquid droplets to be discharged. Further, the processor 41 generates waveform selection data for selecting, for example, one of the multiple kinds of waveform signals, for each nozzle 33 and each driving cycle, depending on a liquid droplet amount for one droplet based on image data.

The controller 40 is connected to a head driving circuit 35. The head driving circuit 35 is connected to the driving elements 34. The controller 40 outputs the waveform signal and the waveform selection data to the head driving circuit 35. The head driving circuit 35 generates the driving signal based on the waveform signal and the waveform selection data and outputs the driving signal to the driving element 34. The driving element 34 is thus driven in response to the driving signal. This applies pressure to the liquid in a channel connected to the nozzle 33 and the liquid droplet is discharged from the nozzle 33.

The controller 40 is connected to a conveyance driving circuit 23. The conveyance driving circuit 23 is connected to the conveyance motor 22. The controller 40 outputs a control signal to the conveyance driving circuit 23, and the conveyance driving circuit 23 outputs a driving signal generated based on the control signal to the conveyance motor 22. Accordingly, a driving timing, rotation velocity, rotation amount, and the like of the conveyance motor 22 are controlled, and the printing medium A is conveyed rearward by a predefined distance or a distance corresponding to the printing data.

<Printing Process>

The controller 40 executes the printing process based on printing data. In the printing process, the controller 40 executes, based on the printing data, a discharge operation in which liquid is discharged from the nozzles 33 by driving the driving elements 34 and a conveyance operation in which the printing medium A is conveyed rearward by driving the conveyance motor 22. Accordingly, the liquid discharged from the nozzles 33 lands on the printing medium A and an image H (FIG. 2) is printed on the printing medium A.

Figure 4B:
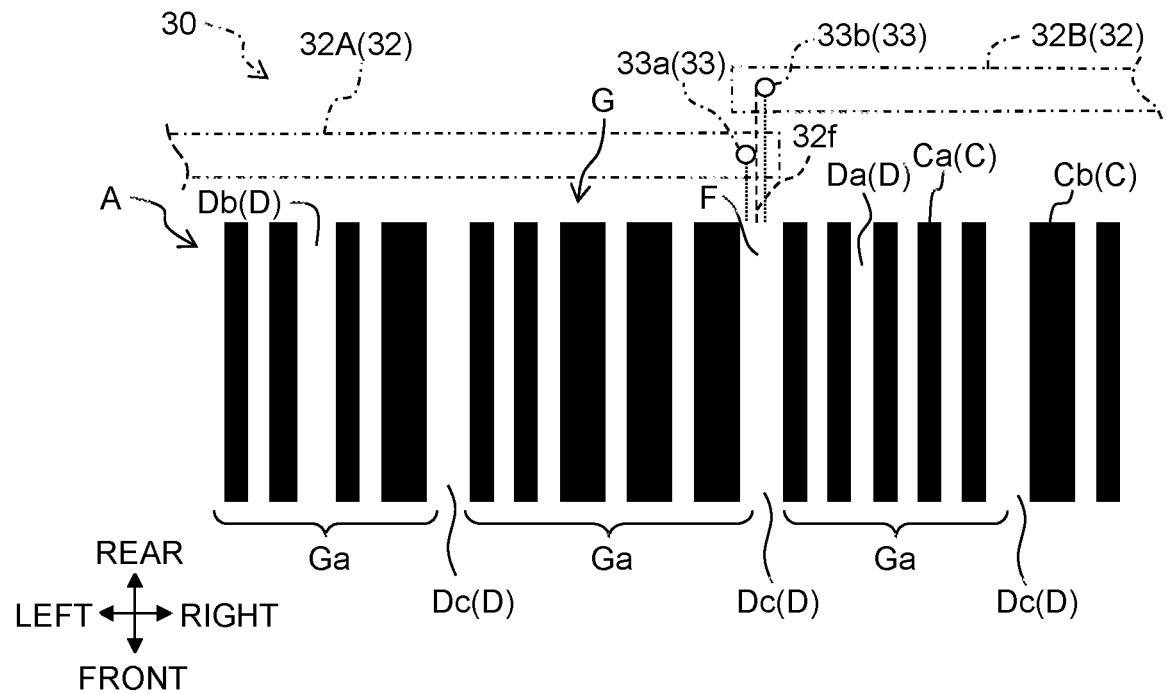
FIG. 4B depicts the head and the bar code when the seam is positioned in a second portion.

As depicted in FIGS. 4A and 4B, the controller 40 prints the bar code G, based on the printing data. The bar code G has a predefined first portion E and a predefined second portion F different from the first portion E. In the bar code G, bars C and spaces D are alternately arranged in the left-right direction. The first portion E and the second portion F are described below.

For example, the bar code G is a one-dimensional code having one or more bar(s) C and one or more space(s) D. The bar(s) C and the space(s) D are arranged in the left-right direction. The bar C absorbs irradiation light from a bar code reader. For example, when a red ray is irradiated from the reader, the bar C has a color of black, blue, green, or the like. The bar C is a straight line having a predefined width in the left-right direction and extending in the front-rear direction. The bar C is formed on the printing medium A by the liquid discharged from the nozzles 33. The width in the left-right direction of the bar C is shorter than the length in the front-rear direction of the bar C.

The space D has absorptance of irradiation light from the barcode reader that is lower than that of the bar C. The space D reflects irradiation light. For example, when the red ray is irradiated from the reader, the space D has a color of white, red, yellow, or the like. The space D is an interval between bars C adjacent to each other in the left-right direction. The space D has a predefined width in the left-right direction. Thus, the bar(s) C and the space(s) D are arranged alternately in the left-right direction.

The space D may be formed on the printing medium A by the liquid discharged from the nozzles 33. When the printing medium A has a color reflecting irradiation light, the space D may be formed by the printing medium A. In this case, the printer 10 prints the bar(s) C without printing the space(s) D. The space D formed by the printing medium A is thus provided between the bars C adjacent to each other.

The bar code G represents one character Ga by combining the bar(s) C and the space(s) D arranged in the left-right direction. When the bar code G represents multiple characters Ga, the characters Ga are arranged in the left-right direction in the bar code G.

Figure 5A:
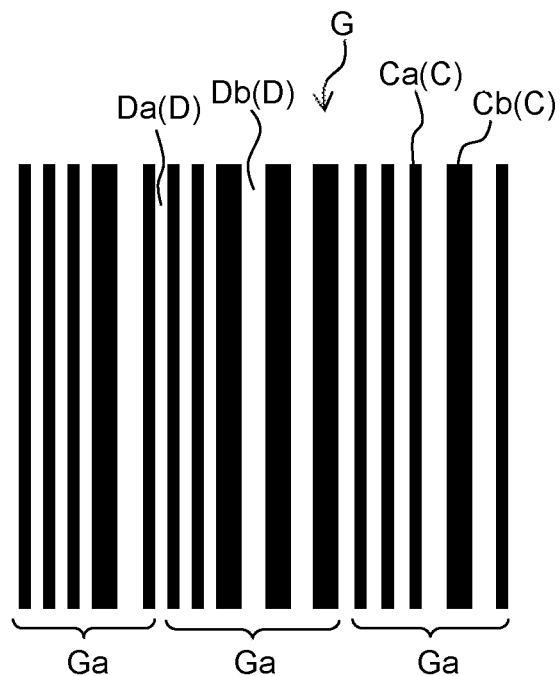
FIG. 5A depicts an example of a multilevel second-type bar code.

The bar code G is classified into a first-type code and a second-type code depending on the presence or absence of a gap Dc between characters. In the first-type bar code G, the space D (gap Dc between characters) is provided between the characters Ga adjacent to each other in the left-right direction as depicted in FIG. 4A. In the second-type bar code G, the gap Dc between characters is not provided between the characters Ga adjacent to each other in the left-right direction, and the characters Ga are arranged continuously as depicted in FIGS. 5A and 5B.

The bar code G is classified into a binary-level code and a multilevel code depending on the widths of the bar C and the space D. The bars C of the binary-level bar code G include two kinds of bars C (narrow bar Ca and wide bar Cb) having mutually different widths. The width in the left-right direction of the narrow bar Ca is smaller than the width in the left-right direction of the wide bar Cb.

From among the binary-level bar codes G, the spaces D of the first-type code depicted in FIG. 4A include two kinds of spaces D (narrow space Da and wide space Db) having mutually different widths and the gaps Dc between characters. The narrow spaces Da and the wide spaces Db are the spaces D forming the characters Ga. In the left-right direction, the width of the narrow space Da is smaller than the width of the wide space Db, and the width of the gap Dc between characters is larger than the width of the narrow space Da. For example, in the left-right direction, the width of the gap Dc between characters is greater than 1 time the width of the narrow space Da and equal to or less than 5 times the width of the narrow space Da. From among the multilevel bar codes G, the spaces D of the second-type code depicted in FIG. 5A do not include the gap Dc between characters, but include the narrows spaces Da and the wide spaces Db.

Figure 5B:
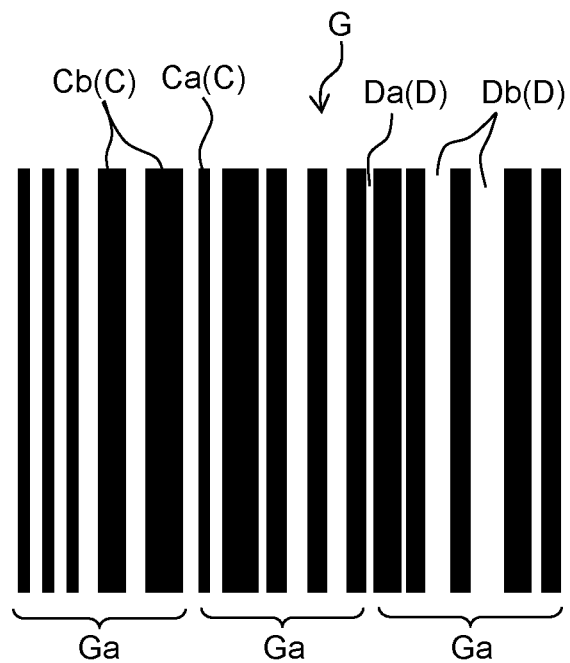
FIG. 5B depicts an example of a multilevel second-type bar code.

The bars C of the multilevel second-type bar code G depicted in FIG. 5B include narrow bars Ca that are the smallest in width among the bars C of the bar code G and multiple kinds of wide bars Cb that are larger in width than the narrow bars Ca. For example, in the left-right direction, the width of the wide bar Cb is greater than 1 time the width of the narrow bar Ca and equal to or less than 4 times the width of the narrow bar Ca.

The spaces D of the multilevel second-type bar code G include narrow spaces Da and multiple kinds of wide spaces Db that are larger in width than the narrow spaces Da. The narrow spaces Da and the wide spaces Db are the spaces D forming the characters Ga. In the left-right direction, the width of the wide space Db is, for example, greater than 1 time the width of the narrow space Da and equal to or less than 4 times the width of the narrow space Da.

<First Determination Process and Adjustment Process>

For example, as depicted in FIG. 4A, the head chips 32 include the left head chip 32A and the right head chip 32B adjacent to each other in the left-right direction. The left head chip 32A is arranged at the left side of the right head chip 32B and at the front side of the right head chip 32B. Thus, on the printing medium A conveyed rearward by the conveyance operation, a left part of the image is printed by the liquid from the left head chip 32A and a right part of the image is printed by the liquid from the right head chip 32B in the printing process.

In this case, the nozzles 33 of the left head chip 32A and the nozzles 33 of the right head chip 32B are arranged in the left-right direction at predefined intervals. The right end nozzle 33a of the left head chip 32A and the left end nozzle 33b of the right head chip 32B are arranged adjacent to each other at a predefined interval. Thus, a landing position (left-end landing position) of the liquid discharged from the left end nozzle 33b is positioned at the right side of a landing position (right-end landing position) of the liquid discharged from the right end nozzle 33a at a predefined interval.

However, when the printing medium A is skewed (obliquely conveyed) in the left-right direction after the printing by the left head chip 32A before the printing by the right head chip 32B, the right-end landing position is shifted in the left-right direction from its original position (i.e., the position at the right side of the left-end landing position at the predefined interval). In this case, the right part of the image overlaps with or separates from the left part of the image. Thus, when the bar code G is printed by the left head chip 32A and the right head chip 32B, the reading accuracy of the bar code G may be decreased due to the shift of the landing position.

The controller 40 thus executes the first determination process for determining, based on the printing data, whether the seam 32f between the head chips 32 adjacent to each other in the intersecting direction is positioned in the first portion E. When the controller 40 has determined in the first determination process that the seam 32f is positioned in the first portion E, the controller 40 executes the adjustment process for adjusting a printing position of the bar code G with respect to the head 30 so that the seam 32f is positioned in the second portion F.

For example, in the first determination process, the controller 40 obtains position information of the bars C included in the bar code G based on the printing data. The position information of the bars C is positions of the spaces D of the bar code G in the image H (FIG. 2) to be printed based on the printing data. For example, the position information of the bars C is coordinates from a predefined position of the image H based on the printing data. The controller 40 calculates the widths of the respective bars C based on the position information, determines the first portion E based on the widths, and stores the position information thereof in the memory 42.

The effect on reading accuracy of the bar code G in the first portion E due to the shift of the liquid landing position in the left-right direction is larger than that in the second portion F. For example, the first portion E is a portion that is included in the bar code G, that is subjected to printing, and that has a small width in the left-right direction. The first portion E is exemplified, for example, by the narrow bar Ca. In the multilevel bar code G, the narrow bar Ca or one or more kinds of wide bar(s) Cb having a width(s) smaller than an average width of all kinds of wide bars Cb included in the bar code G may be used as the first portion E.

The controller 40 determines whether the seam 32f between the left head chip 32A and the right head chip 32B is positioned in the first portion E. The seam 32f is a boundary between a printing area by the left head chip 32A and a printing area by the right head chip 32B. The seam 32f is positioned between the right-end landing position of the liquid from the right end nozzle 33a of the left head chip 32A and the left-end landing position of the liquid from the left end nozzle 33b of the right head chip 32B. A relation between the nozzles 33 and the landing positions is set in advance and stored in the memory 42. The controller 40 refers to this predefined correspondence information, obtains position information of the right-end landing position and position information of the left-end landing position, and compares the right-end landing position and the left-end landing position to the position of the first portion E based on the position information.

When the controller 40 has determined based on the comparison that the first portion E includes the right-end landing position and the left-end landing position, the controller 40 determines that the seam 32f between the left head chip 32A and the right head chip 32B is positioned in the first portion E. When the controller 40 has determined based on the comparison that the first portion E does not include any or both of the right-end landing position and the left-end landing position, the controller 40 determines that the seam 32f is not positioned in the first portion E.

When the controller 40 has determined in the first determination process that the seam 32f is positioned in the first portion E, the controller 40 executes the adjustment process. In the adjustment process, the controller 40 obtains position information of the second portion F of the bar code G in the printing medium A based on the printing data, and stores the position information thereof in the memory 42.

The effect on reading accuracy of the bar code G in the second portion F due to the shift of the liquid landing position in the left-right direction is smaller than that in the first portion E. When the spaces D are not printed, no liquid lands on the spaces D. This makes the effect on the spaces D due to the shift of the landing position small, and thus the space D is used as the second portion F. Even when the spaces D are printed, the effect on the spaces D due to the shift of the landing position is smaller than that on the bars C, because the spaces D reflect irradiation light. The space D is thus used as the second portion F.

Among the multiple kinds of spaces D, the effect on the space D having a large width in the left-right direction due to the shift of the landing position is smaller than any other spaces D having a small width in the left-right direction. Thus, the gap Dc between characters or the wide space Db may be used as the second portion F. Since the gap Dc between characters does not contribute to the characters Ga represented by the bar code G, the gap Dc between characters may be used as the second portion F.

When the spaces D are not printed, the controller 40 specifies position information of the bars C to be printed based on the printing data, and obtains position information of gaps (spaces D) between the bars C adjacent to each other. When the spaces D are printed, the controller 40 determines the bars C and the spaces D based on color information of the printing data, and obtains position information of the spaces D to be printed. The position information of the spaces D is positions of the spaces D in the image H (FIG. 2) based on the printing data. The position information of the spaces D is, for example, coordinates from a predefined position of the image H.

In the first-type bar code G, the controller 40 specifies the characters Ga from the bars C and the spaces D, and determines the gap between the characters Ga adjacent to each other (the gap Dc between characters) as the second portion F, and stores the position information thereof in the memory 42.

In the second-type bar code G, the controller 40 calculates the widths of the spaces D based on the position information, determines the wide space Db included in the spaces D and having a large width as the second portion F, obtains the position information of the wide space Db, and stores the position information thereof in the memory 42. In the multilevel second-type bar code G, the controller 40 may determine the wide space Db that is equal to or more than a predefined multiple of the narrow space Da (e.g., twice the narrow space Da), as the second portion F. Further, the controller 40 may determine the wide space Db having the largest width out of the wide spaces Db, as the second portion F.

As depicted in FIG. 4B, the controller 40 obtains an interval in the left-right direction between the first portion E and the second portion F, moves the printing position of the bar code G from the first portion E side toward the second portion F side by the interval, and stores the printing position of the bar code G after movement in the memory 42. This changes the printing position of the bar code G so that the second portion F includes the right-end landing position and the left-end landing position. Thus, the printing position of the bar code G in the image H (FIG. 2) based on the printing data is adjusted so that the seam 32*f* between the left head chip 32A and the right head chip 32B is positioned in the second portion F. Since the image H is printed by the head 30, the printing position of the bar code G is adjusted with respect to the head 30.

The adjustment of the printing position of the bar code G is executed by rewriting image information such as raster data. The raster data includes position information of areas obtained by dividing the image to be printed into predefined number of areas and color information of the areas. The color information corresponds to the presence or absence of dots. The color information includes, for example, the absence of dot (dot absence) in which no dot is formed and the presence of dot (dot presence) in which the dot is formed. When the color information includes dot-absence data, no liquid is discharged from the nozzle 33 and no dot is formed on the printing medium A. When the color information includes dot-presence data, liquid is discharged from the nozzle 33 and the dot is formed on the printing medium A by liquid, thus printing the image.

In the case of FIG. 4B, the bar code G can be shifted rightward by adding pieces of dot-absence data to the left of the bar code G in the left-right direction. In this situation, dot-absence data, the number of which is the same as the number of pieces of dot-absence data added to the left, is deleted from the right of the bar code G. This unifies the length of the raster data in the left-right direction.

The bar code G can be shifted rightward by deleting pieces of dot-absence data from the right of the bar code G in the left-right direction. In this situation, the dot-absence data, the number of which is the same as the number of pieces of dot-absence data deleted from the right, is added to the left of the bar code G. This unifies the length of the raster data in the left-right direction.

<Printer Control Method>

An exemplary control method of the printer 10 is executed by the controller 40 in accordance with the flowchart of FIG. 6. The controller 40 first obtains printing data (S1). The controller 40 obtains position information of the bars C of the bar code G from the printing data. The controller 40 calculates the widths of the bars C and compares the respective widths. Based on this comparison, the controller 40 determines the narrow bar Ca having the smallest width as the first portion E. Then, the controller 40 stores the position information thereof in the memory 42 (S2).

Then, the controller 40 executes the first determination process (S3). In the first determination process, the controller 40 refers to predefined correspondence information between the nozzles 33 and the landing positions and obtains position information of the right-end landing position of the left head chip 32A and position information of the left-end landing position of the right head chip 32B, the head chips 32A and 32B being adjacent to each other. Then, the controller 40 determines based on the position information whether the first portion E includes the right-end landing position and the left-end landing position.

When the controller 40 has determined that the first portion E includes the right-end landing position and the left-end landing position, the controller 40 determines that the seam 32*f* between the left head chip 32A and the right head chip 32B is positioned in the first portion E (S3: YES). In this case, when the left-end landing position is shifted with respect to the right-end landing position, the effect on the width of the first portion E due to the position shift is large.

Thus, the controller 40 obtains position information of the spaces D of the bar code G from the printing data. The controller 40 determines the space D as the second portion F, and stores the position information thereof in the memory 42 (S4). Here, in the binary-level second-type bar code G, the controller 40 determines the gap Dc between characters as the second portion F. Or, in the binary-level second-type bar code G, the controller 40 determines the wide space Db having a large width as the second portion F. In the multilevel second-type bar code G, the controller 40 determines the wide space Db having a width larger than a predefined width, as the second portion F.

Then, the controller 40 executes the adjustment process (S5). In the adjustment process, the controller 40 changes the printing position of the bar code G based on the position information so that the second portion F includes the right-end landing position and the left-end landing position, thereby correcting the printing data. Accordingly, the seam 32*f* is positioned in the second portion F in which the effect on its width due to the position shift of the seam 32*f* is small.

The controller 40 executes the printing process based on the printing data corrected (S6). Accordingly, the image H including the bar code G of which printing position has been changed is printed on the printing medium A.

When the controller 40 has determined in the first determination process that the first portion E does not include at least any one of the right-end landing position and the left-end landing position, the controller 40 determines that the seam 32*f* is not positioned in the first portion E (S3: NO). In this case, since the effect of the position shift of the seam 32*f* is not caused or is small, the printing process is executed (S6) without adjusting the printing position of the bar code G.

<Effect of Embodiment>

In the printer 10, the controller 40 executes, based on the printing data, the printing process for printing the bar code G in which the bar(s) C and the space(s) D are arranged alternately in the intersecting direction, the bar code G including the predefined first portion E and the predefined second portion F different from the first portion E. The controller 40 executes, based on the printing data, the first determination process for determining whether the seam 32*f* between head chips 32 adjacent to each other in the intersecting direction is positioned in the first portion E. When the controller 40 has determined in the first determination process that the seam 32*f* is positioned in the first portion E, the controller 40 executes the adjustment process for adjusting the printing position of the bar code G with respect to the head 30 so that the seam 32*f* is positioned in the second portion F.

In the seam 32*f* between head chips 32 adjacent to each other according to this embodiment, the landing position of the liquid discharged from the nozzle 33 of one of the head chips 32 is likely to be shifted from the landing position of the liquid discharged from the nozzle 33 of the other of the head chips 32. Thus, for example, when the effect on reading accuracy of the bar code G in the first portion E due to the shift of the landing position is larger than that in the second portion F, the printing position of the bar code G is changed so that the seam 32*f* is not positioned in the first portion F but in the second portion F. This inhibits the decrease in reading accuracy of the bar code G that may otherwise be caused by the shift of the landing position in the seam 32*f*.

In the printer 10, the bar code G is in the first-type (e.g., discrete type) that includes the characters Ga formed by the bars C and the spaces D and that includes the gaps Dc between characters (the gaps between the characters Ga adjacent to each other in the intersecting direction). The second portion F is the gap Dc between characters.

In this configuration, the gaps Dc between characters do not contribute to the representation of the characters Ga and have a larger width than any other spaces D. This inhibits the decrease in reading accuracy of the bar code G even when the shift of the landing position is caused in the gaps Dc between characters.

In the printer 10, the bar code G is in the second-type (e.g., continuous type) that includes the characters Ga formed by the bars C and the spaces D and that does not include the gaps Dc between characters (the gaps between the characters Ga adjacent to each other in the intersecting direction). The second portion F is the space D included in the spaces D in the bar code G and having a width in the intersection direction larger than the space D having the smallest width in the intersecting direction.

In this configuration, since the spaces D are not printed or are printed by a color that is more likely to reflect irradiation light than the bars C, the effect on reading accuracy in the spaces D is smaller than that in the bars C. Further, in the space D having a large width, the ratio of the position shift to the width is small. It is thus possible to inhibit the decrease in reading accuracy of the bar code G even when the shift of the landing position is caused.

In the printer 10, the second portion F is the space D included in the spaces D in the bar code G and having a width in the intersecting direction equal to or more than twice the space D having the smallest width in the intersecting direction. In this configuration, the ratio of the shift of the landing position to the width of the wide space Db is small. It is thus possible to inhibit the decrease in reading accuracy of the bar code G. Further, since the number of the wide spaces Db having the width equal to or more than twice the space D having the smallest width is equal to or more than the number of wide spaces Db having the largest width, there are a lot of candidates of the second portion F and there is flexibility in the printing position of the bar code G.

In the printer 10, the second portion F is the space D included in the spaces D in the bar code G and having the largest width in the intersecting direction. In this configuration, the ratio of the shift of the landing position to the wide space Db having the largest width is the smallest among the wide spaces Db. This further inhibits the decrease in reading accuracy of the bar code G.

First Modified Embodiment

In the printer 10 according to a first modified embodiment, the controller 40 executes a first obtaining process for obtaining printing data in the control method of the above embodiment. Before the adjustment process, the controller 40 executes a conversion process for converting gradations of the printing data obtained by the first obtaining process into gradations of the printer 10. The number of the gradations of the printer 10 is smaller than the number of the gradations of the printing data.

Figure 7:
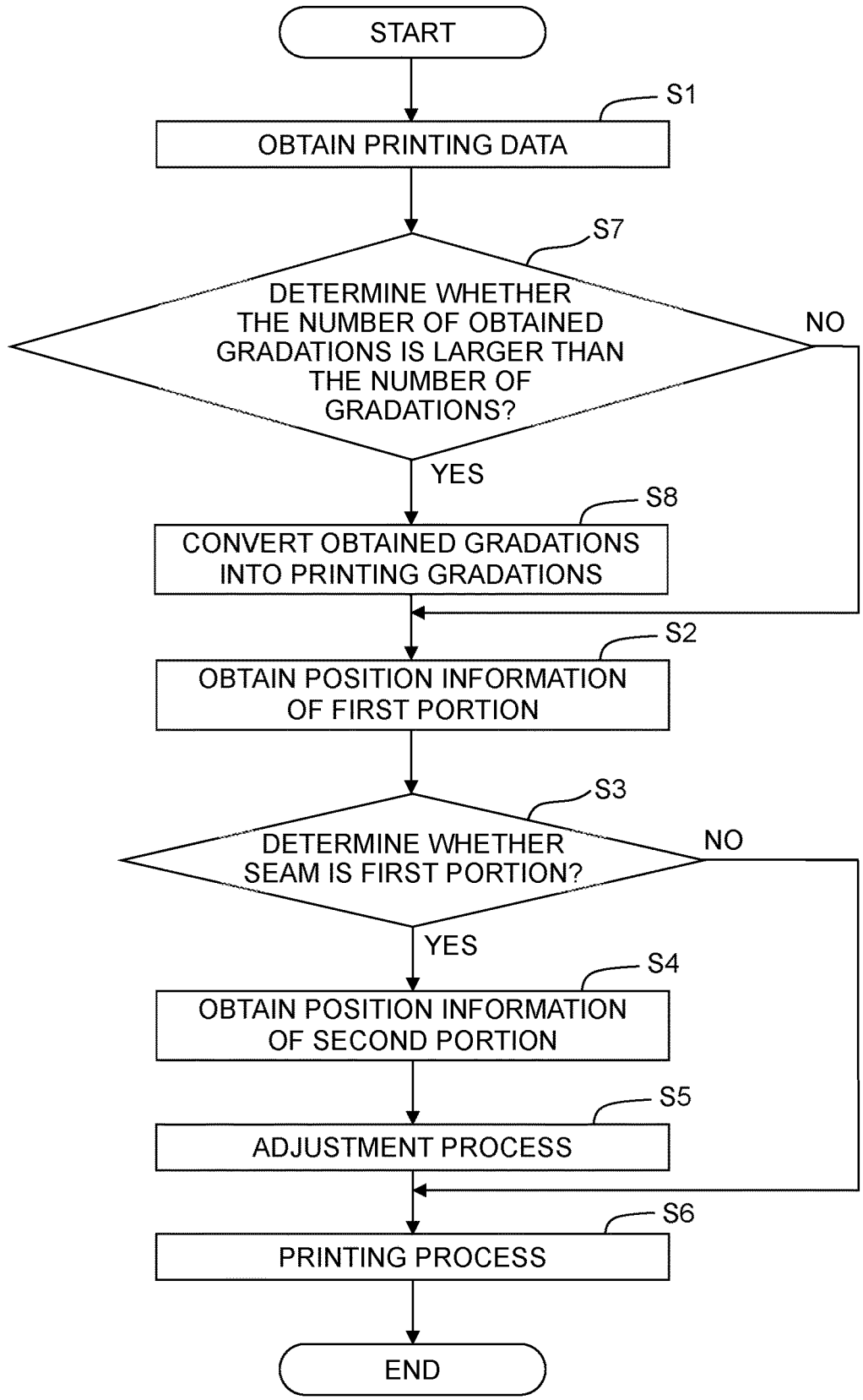
FIG. 7 is a flowchart indicating an example of a control method of a printer according to a first modified embodiment.

For example, the control method of the printer 10 according to the first modified embodiment is executed by the controller 40 in accordance with the flowchart indicated in FIG. 7. In the flowchart of FIG. 7, processes S7 and S8 are executed between the process S1 and the process S2 in the flowchart of FIG. 6.

Specifically, the controller 40 obtains printing data from the external apparatus B and executes the first obtaining process (S1). The controller 40 obtains gradations (obtained gradations) from the printing data obtained by the first obtaining process and determines whether the number of obtained gradations is larger than the number of gradations (printing gradations) that can be formed by the printer 10 (S7).

When the controller 40 has determined that the number of obtained gradations is equal to or less than the number of printing gradations (S7: NO), the printer 10 can execute printing using the obtained gradations. Thus, the controller 40 moves to the process S2 without converting the obtained gradations into the printing gradations, and executes the subsequent processes S2 to S6.

When the controller 40 has determined that the number of obtained gradations is greater than the number of printing gradations (S7: YES), the printer 10 can not execute printing using the obtained gradations. For example, the obtained gradations are 256 gradations. The printing gradations are set in advance depending on a size of dots formed by the liquid discharged from the nozzles 33, and the printing gradations are stored in the memory 42. For example, when the sizes of dots include: the absence of dot in which no liquid is discharged from the nozzle 33; a small dot formed by liquid in an amount smaller than a predefined amount; a medium dot formed by liquid in the predefined amount; and a large dot formed by liquid in an amount larger than the predefined amount, the printing gradations are four gradations. Such a correspondence relation between the obtained gradations and the printing gradations is stored in the memory 42.

Thus, the controller 40 converts the obtained gradations into the printing gradations based on the predefined correspondence relationship (S8). This reduces information amount of the printing data. It is thus possible to quickly execute the subsequent processes S2 to S6 based on the printing gradations converted.

Second Modified Embodiment

In the printer 10 according to a second modified embodiment, the controller 40 executes, based on printing data, a second determination process for determining which of a first printing mode and a second printing mode is to be executed. In the first printing mode, the adjustment process and the printing process are executed. In the second printing mode, the printing process is executed without execution of the adjustment process.

Figure 8:
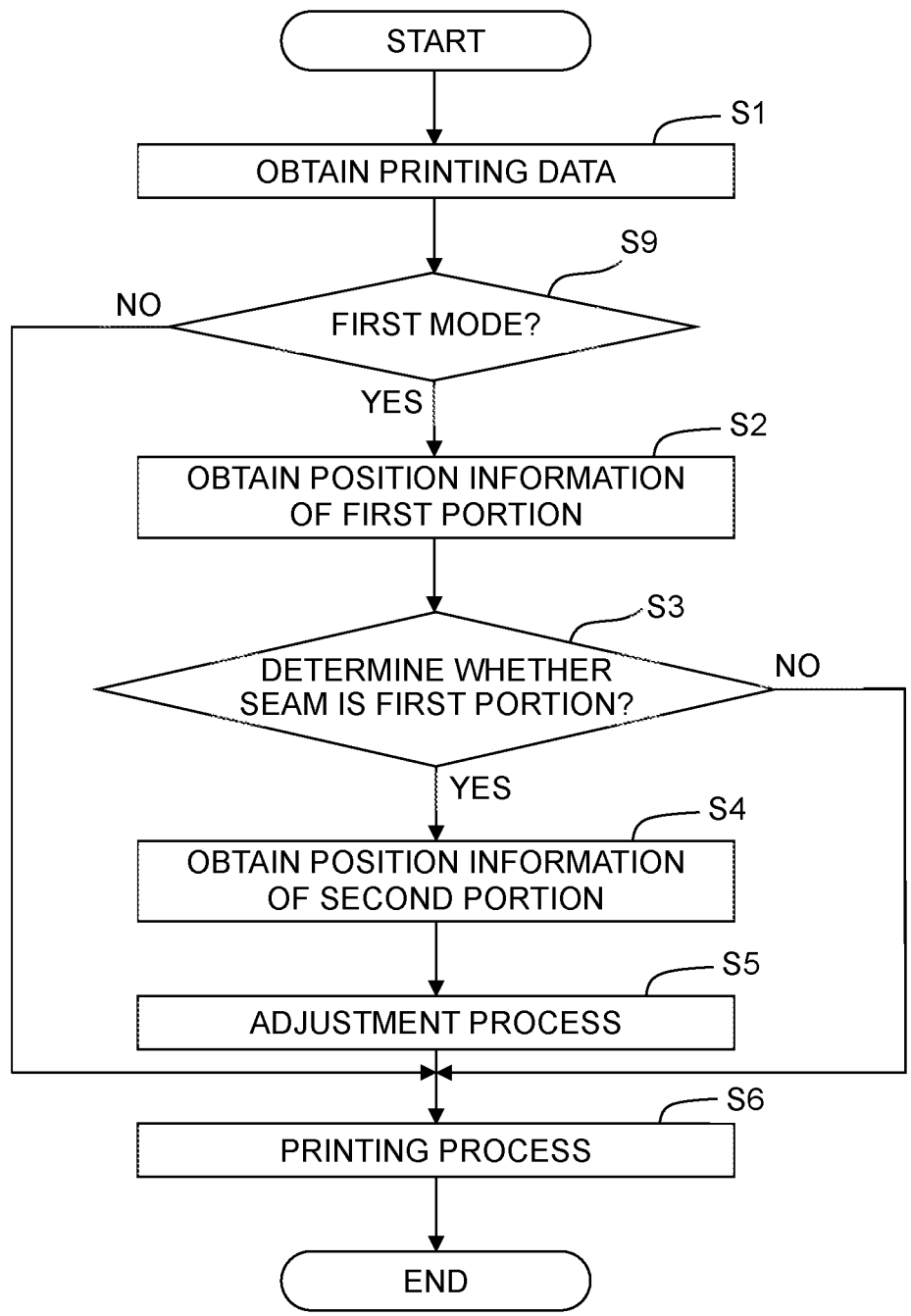
FIG. 8 is a flowchart indicating an example of a control method of a printer according to a second modified embodiment.

For example, the control method of the printer 10 according to the second modified embodiment is executed by the controller 40 in accordance with the flowchart indicated in FIG. 8. In the flowchart of FIG. 8, a process S9 is executed between the process S1 and the process S2 in the flowchart of FIG. 6. When the second determination process is executed in the first modified embodiment, the process S9 is executed between the process S8 and the process S2 in the flowchart of FIG. 7.

Specifically, the controller 40 obtains printing data (S1) and executes the second determination process based on the printing data (S9). In this case, the printing data includes mode data. The mode data specifies a first mode or a second mode. The mode data may be included in the printing data of the external apparatus B or may be added to the printing data by an input apparatus 15 (FIG. 3) or the like. The input apparatus 15 is, for example, buttons and a touch panel. The input apparatus 15 is provided for the printer 10 and connected to the controller 40. When a user operates the input apparatus 15, the mode data is input to the controller 40 and is added to the printing data.

In the second determination process, the controller 40 determines, based on the mode data, which of the first mode and the second mode is to be executed. In the first mode, the adjustment process and the printing process are executed. In the second mode, the printing process is executed without execution of the adjustment process. When the controller 40 has determined that the mode data is the first mode (S9: YES), the controller 40 obtains position information of the first portion E based on the printing data (S2). When the controller 40 has determined that the seam 32f is positioned in the first portion E (S3: YES), the controller 40 executes the adjustment process for adjusting the printing position of the bar code G so that the seam 32f is positioned in the second portion F (S5) and then executes the printing process (S6). Accordingly, the printing position of the bar code G is adjusted in accordance with the intention of the user, inhibiting the decrease in reading accuracy of the bar code G.

When the controller 40 has determined that the mode data is the second mode (S9: NO), the controller 40 executes the printing process without executing the processes S2 to S5 (S6). Accordingly, printing is quickly executed in accordance with the intention of the user.

Third Modified Embodiment

In the printer 10 according to a third modified embodiment, the controller 40 executes an extraction process for extracting candidates of the second portion F from among the spaces D in the bar code G. The controller 40 executes a determination process for determining, as the second portion F, a candidate that is closest to the first portion E from among the candidates of the second portion F extracted by the extraction process.

Figure 9:
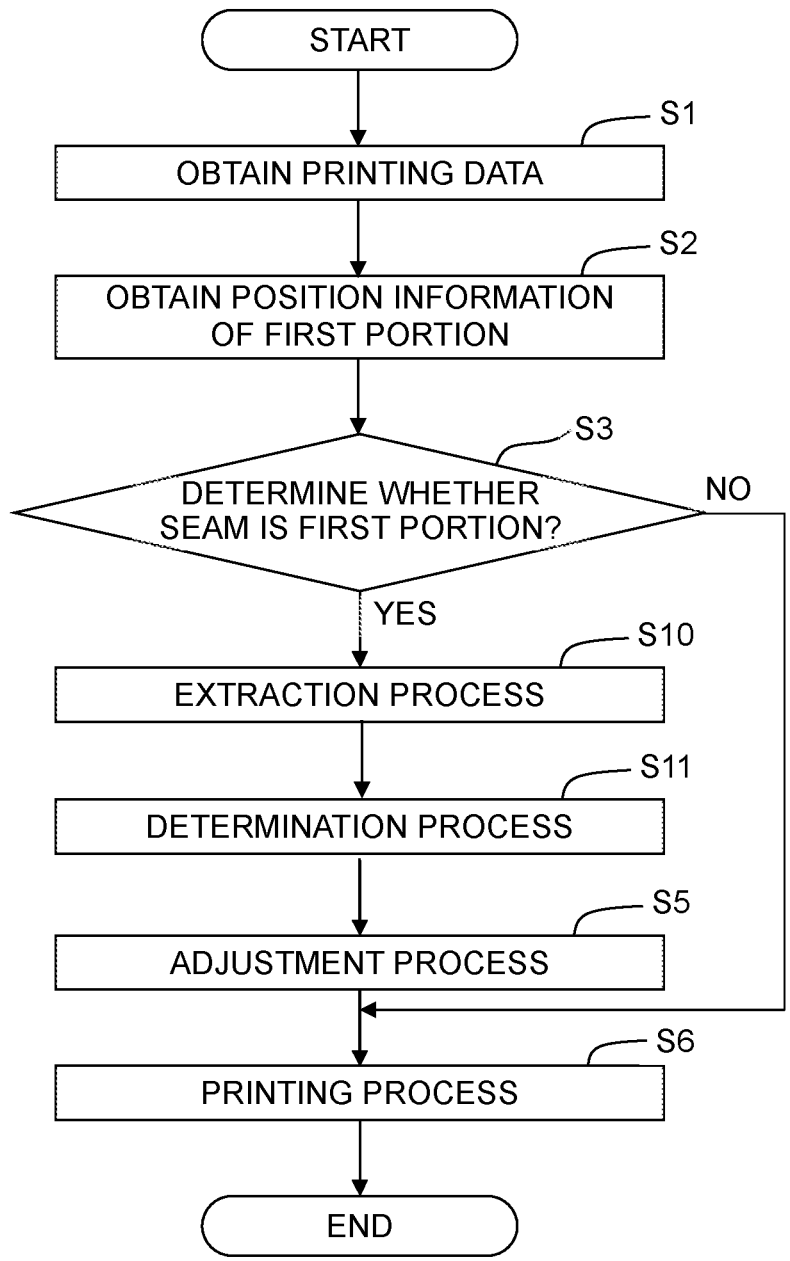
FIG. 9 is a flowchart indicating an example of a control method of a printer according to a third modified embodiment.

For example, the control method of the printer 10 according to the third modified embodiment is executed by the controller 40 in accordance with the flowchart indicated in FIG. 9. In the flowchart indicated in FIG. 9, processes S10 and S11 are executed instead of the process S4 in the flowchart of FIG. 6. In the first modified embodiment, the processes S10 and S11 are executed instead of the process S4 in the flowchart of FIG. 7. In the second modified embodiment, the processes S10 and S11 are executed instead of the process S4 in the flowchart of FIG. 8.

Specifically, when the controller 40 has determined based on the printing data that the seam 32f is positioned in the first portion E (S1, S2, S3: YES), the controller 40 executes the extraction process (S10) and executes the determination process (S11) on the candidates of the second portion F extracted by the extraction process.

In the extraction process for the first-type bar code G, the controller 40 specifies the characters Ga from the bars C and the spaces D of the bar code G, extracts gaps between characters Ga adjacent to each other (gaps Dc between characters) as the candidates of the second portion F, and stores the position information thereof in the memory 42. In the determination process, the controller 40 calculates intervals between the first portion E and the gaps Dc between characters as the candidates of the second portion F. The controller 40 determines the gap Dc between characters included in the candidates and having the smallest interval as the second portion F, because it is closest to the first portion E. Then, the controller 40 stores the position information thereof in the memory 42.

In the extraction process for the binary-level second-type bar code G, the controller 40 calculates the widths of the spaces D based on the position information, extracts the wide spaces Db included in the spaces D and having widths larger than the narrow space Da as the candidates of the second portion F, and stores the position information thereof in the memory 42. In the determination process, the controller 40 calculates intervals between the first portion E and the wide spaces Db as the candidates. The controller 40 determines the wide space Db included in the candidates and having the smallest interval as the second portion F, because it is closest to the first portion E. Then, the controller 40 stores the position information thereof in the memory 42.

In the extraction process for the multilevel second-type bar code G, the controller 40 calculates the widths of the spaces D based on the position information, extracts, as the candidates of the second portion F, wide spaces Db that are included in the spaces D and that are equal to or more than a predefined multiple of the narrow space Da (e.g., twice the narrow space Da) or the wide spaces Db having the largest width. Then, the controller 40 stores the position information thereof in the memory 42. In the determination process, the controller 40 calculates intervals between the first portion E and the wide spaces Db as the candidates, and determines the wide space Db included in the candidates and having the smallest interval as the second portion F, because it is closest to the first portion E. Then, the controller 40 stores the position information thereof in the memory 42.

Then, the controller 40 adjusts the printing position of the bar code G with respect to the head 30 so that the seam 32f is positioned in the second portion F determined by the determination process (S5). The controller 40 prints the image H including the bar code G of which printing position has been adjusted (S6). Accordingly, the bar code G can be printed near the printing position intended by the user.

Fourth Modified Embodiment

In the printer 10 according to a fourth modified embodiment, the controller 40 executes a second obtaining process for obtaining position information of the first portion E and position information of the second portion F based on printing data. The controller 40 executes a third determination process for determining based on the position information whether an interval between the first portion E and the second portion F is larger than a predefined interval. The controller 40 executes a fourth determination process for determining whether the first portion E is the bar C. When the controller 40 has determined in the third determination process that the interval between the first portion E and the second portion F is larger than the predefined interval and has determined in the fourth determination process that the first portion is the bar C, the controller 40 executes a change process for changing the second portion F from that obtained by the second obtaining process to the space D adjacent to the first portion E.

Figure 10:
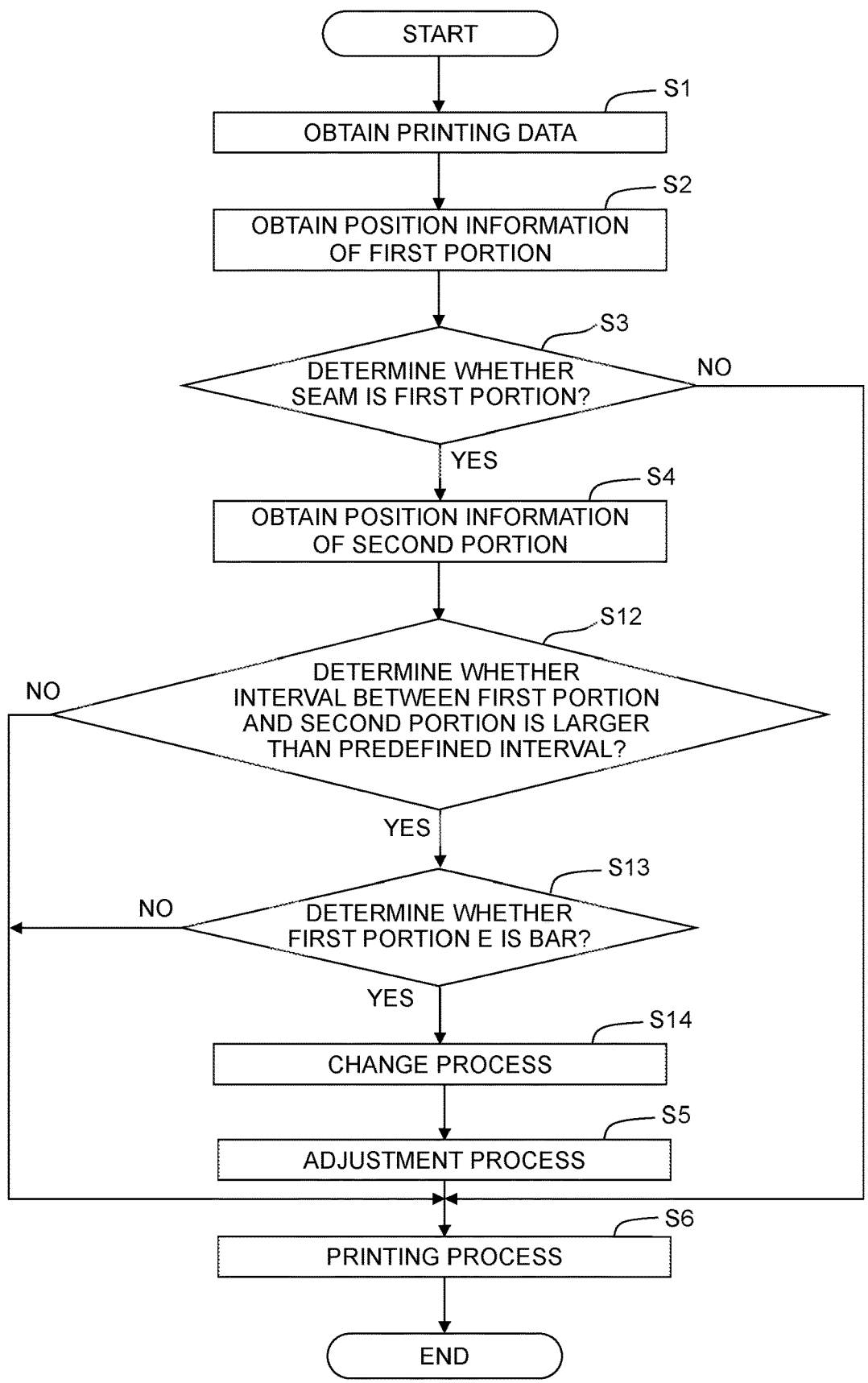
FIG. 10 is a flowchart indicating an example of a control method of a printer according to a fourth modified embodiment.

For example, a control method of the printer 10 according to the fourth modified embodiment is executed by the controller 40 in accordance with the flowchart indicated in FIG. 10. In the flowchart of FIG. 10, processes S12 to S14 are executed between the process S4 and the process S5 in the flowchart of FIG. 6. In the first modified embodiment, the processes S12 to S14 are executed between the process S4 and the process S5 in the flowchart of FIG. 7. In the second modified embodiment, the processes S12 to 14 are executed between the process S4 and the process S5 in the flowchart of FIG. 8. In the third modified embodiment, the processes S12 to 14 are executed between the process S11 and the process S5 in the flowchart of FIG. 9.

Specifically, the controller 40 obtains printing data and executes the first obtaining process (S1). The controller 40 executes the first obtaining process to obtain position information of the first portion E based on the printing data and to store the position information thereof in the memory 42 (S2). When the controller 40 has determined that the seam 32f is positioned in the first portion E (S3: YES), the controller 40 executes the second obtaining process to obtain position information of the second portion F based on the printing data and to store the position information thereof in the memory 42 (S4).

Then, the controller 40 executes the third determination process (S12). In the third determination process, the controller 40 calculates the interval between the first portion E and the second portion F in the left-right direction based on the position information of the first portion E obtained in the process S2 and the position information of the second portion E obtained in the process S4, and stores the interval calculated in the memory 42. The controller 40 determines whether the interval between the first portion E and the second portion F is larger than the predefined interval. When the interval between the first portion E and the second portion F is larger than the predefined interval, and when the controller 40 adjusts the printing position of the bar code G so that the seam 32F is positioned in the second portion F, the printing position of the bar code G is considerably shifted from the printing position intended by the user.

Thus, when the interval between the first portion E and the second portion F is larger than the predefined interval (S12: YES), the controller 40 executes the fourth determination process for determining whether the first portion E is the bar C (S13). When the controller 40 has determined that the first portion E is the bar C (S13: YES), the controller 40 executes the change process (S14).

In the change process, the controller 40 changes the second portion F from that obtained by the second obtaining process (S4) to the space D adjacent to the first portion E, and stores the position information thereof in the memory 42. When the spaces D are provided at both sides of the bar C that is the first portion E, one of the spaces D having a larger width is determined as the second portion F, and the position information thereof is stored in the memory 42.

The controller 40 adjusts the printing position of the bar code G with respect to the head 30 so that the seam 32f is positioned in the second portion F changed by the change process (S5). Then, the controller 40 prints the image H including the bar code G of which printing position has been adjusted (S6). This makes it possible to print the bar code G near the printing position intended by the user while inhibiting the decrease in reading accuracy of the bar code G.

When the interval between the first portion E and the second portion F is equal to or less than the predefined interval (S12: NO), the controller 40 does not execute the change process (S13, S14). When the controller 40 has determined that the first portion E is not the bar C (S13: NO), the controller 40 does not execute the change process (S14). Then, the controller 40 executes the adjustment process (S5) for adjusting the printing position of the bar code G with respect to the head 30 so that the seam 32f is positioned in the second portion F obtained by the second obtaining process (S4). Then, the controller 40 executes the printing process (S6). Accordingly, the bar code G is printed while further inhibiting the decrease in reading accuracy of the bar code G.

In the change process (S14), the controller 40 changes the second portion F from that obtained by the second obtaining process (S4) to the space D adjacent to the first portion E. When the change process (S14) is executed in FIG. 9, the processes S10 and S11 correspond to the second obtaining process. Thus, the candidate that is included in the candidates of the second portion F extracted by the extraction process (S10) and that is determined as the second portion F by the determination process (S11) is the second portion F based on the printing data. Thus, in the change process, the controller 40 changes the second portion F from that determined by the determination process (S11) to the space D adjacent to the first portion E.

All the above embodiments may be combined provided that no contradiction or exclusion is caused. From the above description, many modifications and other embodiments of the present disclosure are apparent to those skilled in the art. The above description should thus be interpreted as just examples, and is provided to teach those skilled in the art the best mode for carrying out the present disclosure. Details about the configurations and/or the functions described above may be substantially changed without departing from the gist and scope of the present disclosure.

The printer, the printer control method, and the non-transitory computer readable medium storing the printer control program are capable of inhibiting the decrease in reading accuracy of the bar code that may otherwise be caused by the shift of the landing position.

What is claimed is:
1. A printer comprising:
a head including a plurality of head chips each of which includes a plurality of nozzles from which a liquid is discharged onto a medium;

a conveyor configured to convey the medium in a conveyance direction, and a controller, wherein, in the head, the head chips are arranged in an intersecting direction that intersects with the conveyance direction, and two head chips that are included in the head chips and that are adjacent to each other in the intersecting direction are shifted from each other in the conveyance direction, wherein the controller is configured to execute:

as a printing process, printing a bar code based on printing data, the bar code including a bar and a space alternately arranged in the intersecting direction, the bar code including a predefined first portion and a predefined second portion different from the first portion, as a first determination process, determining based on the printing data whether a seam between the two head chips adjacent to each other in the intersecting direction is positioned in the first portion, as an adjustment process, adjusting a printing position of the bar code with respect to the head so that the seam is positioned in the second portion in a case that the controller has determined in the first determination process that the seam is positioned in the first portion.

2. The printer according to claim 1, wherein the controller is configured to execute:

as a first obtaining process, obtaining the printing data, and as a conversation process, converting gradations of the printing data obtained by the first obtaining process into gradations of the printer, the number of which is smaller than the number of the gradations of the printing data, before executing the adjustment process.

3. The printer according to claim 1, wherein the controller is configured to execute, as a second determination process, determining based on the printing data whether any of a first printing mode and a second printing mode is to be executed, the adjustment process and the printing process being executed in the first printing mode, the printing process being executed without execution of the adjustment process in the second printing mode.

4. The printer according to claim 1, wherein the bar includes a plurality of bars and the space includes a plurality of spaces, wherein the bar code includes a plurality of characters formed by the bars and the spaces, wherein the bar code is in a first type in which a gap between characters is provided between the characters adjacent to each other in the intersecting direction, and wherein the second portion is the gap between characters.

5. The printer according to claim 1, wherein the bar includes a plurality of bars and the space includes a plurality of spaces, wherein the bar code includes a plurality of characters formed by the bars and the spaces, wherein the bar code is in a second type in which a gap between characters is not provided between the characters adjacent to each other in the intersecting direction, and wherein the second portion is a space that is included in the spaces in the bar code and that has a width in the intersecting direction larger than a space that is included in the spaces in the bar code and that has a smallest width in the intersecting direction.

6. The printer according to claim 5, wherein the second portion is a space that is included in the spaces in the bar code and that has a width in the intersecting direction equal to more than twice the space having the smallest width in the intersecting direction.

7. The printer according to claim 5, wherein the second portion is a space that is included in the spaces in the bar code and that has a largest width in the intersecting direction.

8. The printer according to claim 1, wherein the bar includes a plurality of bars and the space includes a plurality of spaces, wherein the controller is configured to execute:

as an extraction process, extracting a plurality of candidates of the second portion from among the spaces in the bar code, as a determination process, determining a candidate that is included in the candidates of the second portion extracted by the extraction process and that is the closest to the first portion, as the second portion.

9. The printer according to claim 1, wherein the controller is configured to execute:

as a second obtaining process, obtaining position information of the first portion and position information of the second portion based on the printing data, as a third determination process, determining based on the position information whether an interval between the first portion and the second portion is larger than a predefined interval, as a fourth determination process, determining whether the first portion is the bar, and as a change process, changing the second portion from the second portion obtained by the second obtaining process to a space that is included in the spaces in the bar code and that is adjacent to the first portion, in a case that the controller has determined in the third determination process that the interval between the first portion and the second portion is larger than the predefined interval, and in a case that the controller has determined in the fourth determination process that the first portion is the bar.

10. A control method of a printer, the printer comprising:

a head including a plurality of head chips each of which includes a plurality of nozzles from which a liquid is discharged onto a medium; and a conveyor configured to convey the medium in a conveyance direction, wherein, in the head, the head chips are arranged in an intersecting direction that intersects with the conveyance direction, and two head chips that are included in the head chips and that are adjacent to each other in the intersecting direction are shifted from each other in the conveyance direction, the control method comprising:

printing a bar code based on printing data, the bar code including a bar and a space alternately arranged in the intersecting direction, the bar code including a predefined first portion and a predefined second portion different from the first portion;

determining based on the printing data whether a seam between the two head chips adjacent to each other in the intersecting direction is positioned in the first portion; and adjusting a printing position of the bar code with respect to the head such that the seam is positioned in the second portion in a case that the controller has determined that the seam is positioned in the first portion.

11. A non-transitory computer readable medium storing a control program of a printer,
the printer comprising:
a head including a plurality of head chips each of which has a plurality of nozzles from which a liquid is discharged on a medium;
a conveyor configured to convey the medium in a conveyance direction; and
a controller,
wherein, in the head, the head chips are arranged in an intersecting direction that intersects with the conveyance direction, and two head chips that are included in the head chips and that are adjacent to each other in the intersecting direction are shifted from each other in the conveyance direction,
wherein the program is configured to cause the printer, via the controller, to:
print a bar code based on printing data, the bar code including a bar and a space alternately arranged in the intersecting direction, the bar code including a predefined first portion and a predefined second portion different from the first portion;
determine based on the printing data whether a seam between the two head chips adjacent to each other in the intersecting direction is positioned in the first portion; and
adjust a printing position of the bar code with respect to the head so that the seam is positioned in the second portion in a case that the controller has determined in the first determination process that the seam is positioned in the first portion.

* * * * *